Feb. 27, 1940. J. W. MYERS 2,192,095
COFFEE MAKER
Filed Oct. 22, 1937 3 Sheets-Sheet 2

Inventor:—
Joseph W. Myers
by his Attorneys
Howson & Howson

Feb. 27, 1940. J. W. MYERS 2,192,095
COFFEE MAKER
Filed Oct. 22, 1937 3 Sheets-Sheet 3

Inventor:—
Joseph W. Myers
by his Attorneys
Howson & Howson

Patented Feb. 27, 1940

2,192,095

UNITED STATES PATENT OFFICE 2,192,095

COFFEE MAKER

Joseph W. Myers, Philadelphia, Pa., assignor to Proctor & Schwartz, Incorporated, Philadelphia, Pa., a corporation of Pennsylvania Application October 22, 1937, Serial No. 170,440

4 Claims. (Cl. 53—3)

This invention relates to coffee makers and devices for making similar beverage infusions. At the present time the so-called "drip method" is recognized as one of the most satisfactory, as well as popular, methods of making coffee. This method briefly consists in permitting a small stream of hot water, which has just previously been brought to a boil, to slowly seep through a bed of ground coffee and then pass into a receiving receptacle from which it is later dispensed as beverage. This method is generally preferred by coffee connoisseurs because it most nearly approaches the "ideal" conditions established by scientific investigations of the subject. These conditions demand that water at a temperature of between 203 and 185 degrees F. be brought in contact with the coffee grounds for a limited time, that the finished or semi-finished beverage should not be reheated to as high a temperature as the extraction temperature, and for efficiency's sake the liquid remaining in the grounds should be of less concentration than the whole of the beverage.

The present invention has for its principal object to improve the actual extraction and simplification of the process, and to provide a method which substantially meets the "ideal" requirements or conditions.

Generally speaking, the novel device provided by this invention comprises a heater which is interposed between two containers or receptacles so as to heat the water as it passes from one receptacle to the other. Heretofore, there have been proposed devices of this general character which have employed the water as a current-conducting medium in order to raise the temperature of the water to the boiling point as it passes from one receptacle to the other. Such devices have not been satisfactory commercially and at the present time are not being used. The method employed by these devices is objectionable because of the electrolytic decomposition of the water and its mineral content which tends to impair the flavor of the coffee infusion and, furthermore, the variable electric resistance of water in different localities and the impossibility of insuring proper temperature control of the water being delivered have rendered these devices further objectionable.

In accordance with the present invention, there is provided an electric heating unit having a heating surface of predetermined area and heat output, and a stream of unheated water is passed at a diminishing slow rate of flow over the said surface so that the heating unit delivers a stream of heated water whose temperature increases progressively. This stream of heated water is passed through a bed of coffee grounds and the coffee infusion is collected in a receptacle for that purpose. The heating unit, which has a constant electrical input, embodies a thermostatic control which prevents the temperature of the heating surface from rising above a certain value when the heat demand is less than that available. By this coffee-making device, the objectionable features of prior devices are eliminated and the method of making the coffee infusion is caused to substantially meet the "ideal conditions".

The invention may be more clearly understood by reference to the accompanying drawings, wherein Fig. 1 is an elevational view of the coffee-making device provided by the invention;

Figure 1:
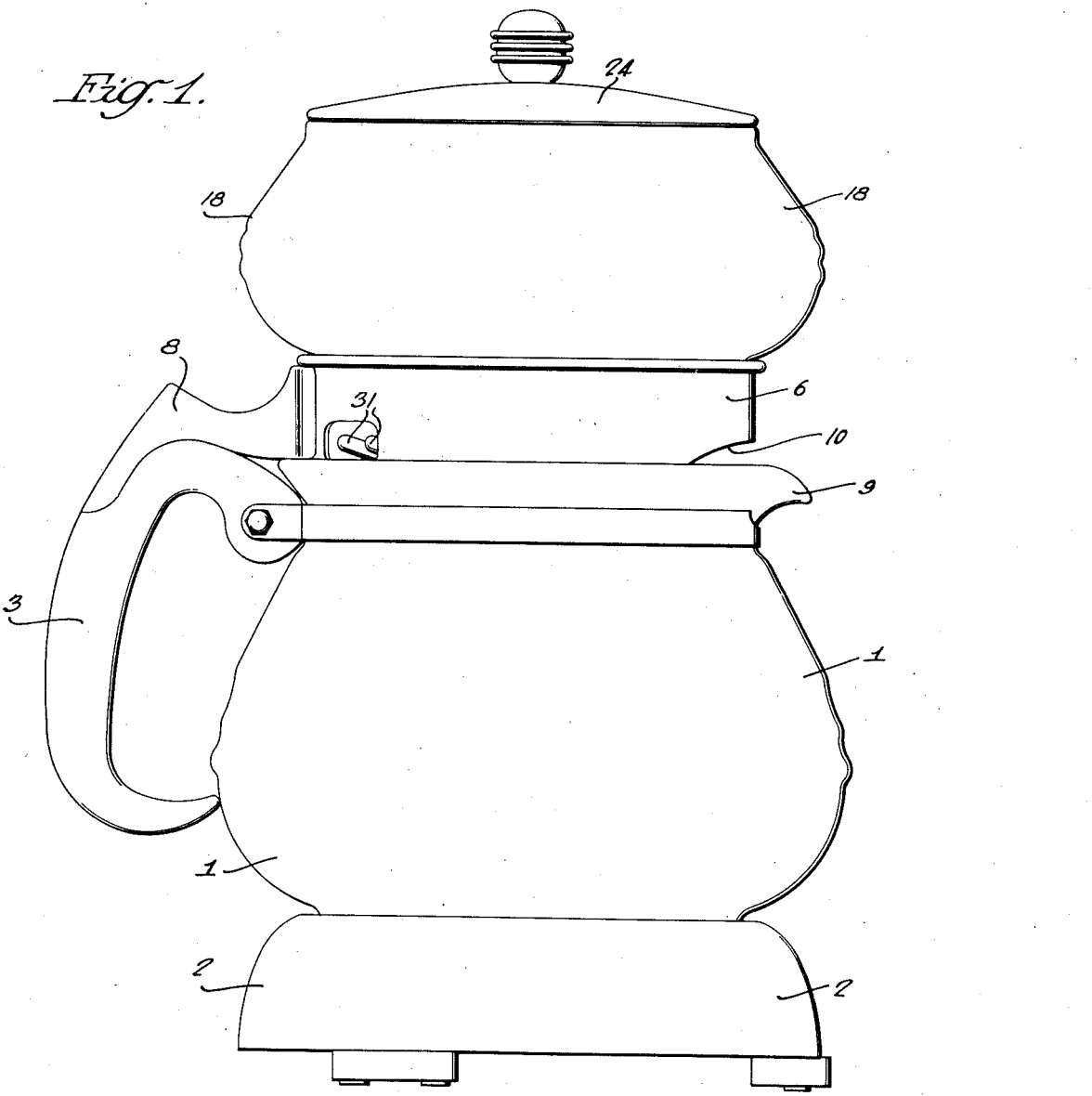
Figure 2:
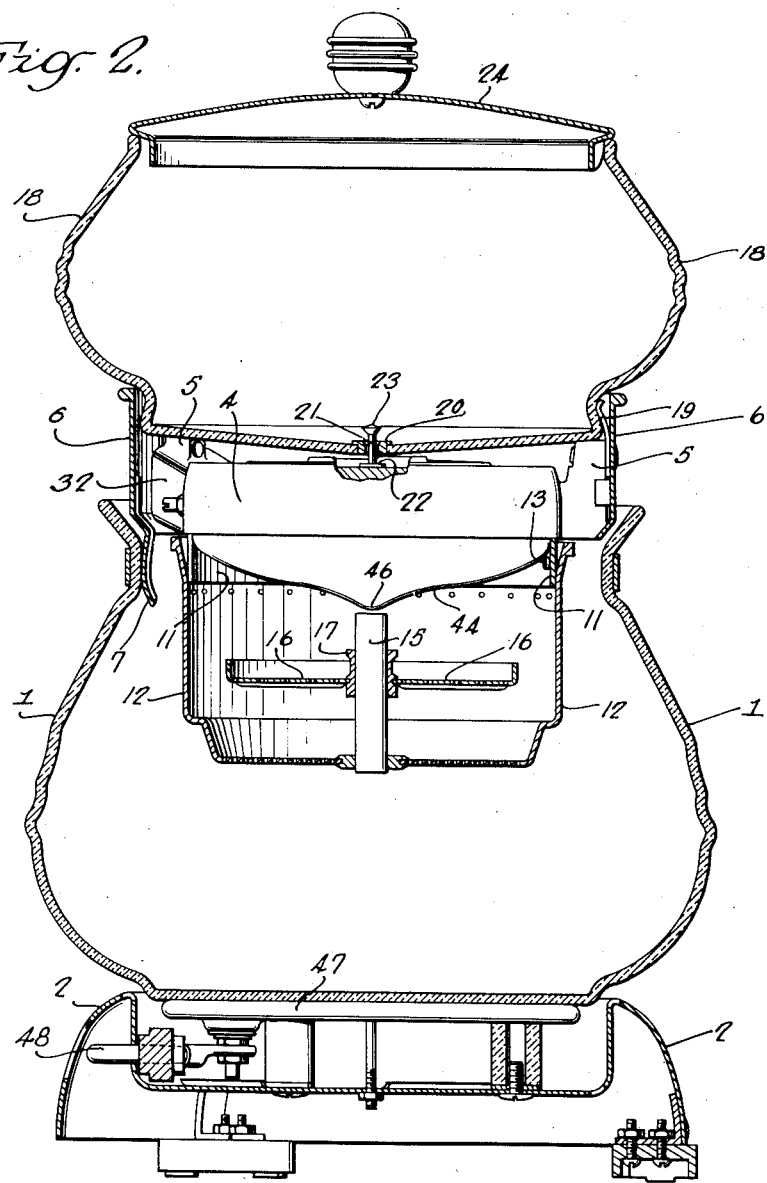
Fig. 2 is a sectional view of the device.

Referring particularly to Figs. 1 and 2, there is provided a coffee infusion receptacle 1 which is preferably formed of glass and is adapted to be placed upon a heater 2, as will be discussed further hereinafter. The receptacle 1 is provided with a handle 3 by means of which it may be readily handled. A heating unit 4, which will be discussed further hereinafter, is carried by spider supports 5 which in turn are attached to a supporting ring 6. This supporting ring has depending resilient fingers 7 which are adapted to engage the inner wall of the neck of receptacle 1 as shown clearly in Fig. 2. The ring 6 carries a handle member 8 (see Fig. 1) which is formed complementary to the handle 3 so as to seat thereon when the device is assembled, thus permitting the device to be more readily handled as a unit by grasping the handle members together. The receptacle 1 preferably has a pouring spout 9, and the ring 6 is preferably cut away or recessed at 10 adjacent the pouring spout 9 so that the coffee infusion may be readily poured from the receptacle 1 without detaching the parts of the device.

The heating unit 4 has a depending flange 11 to which there is removably attached a coffee ground container 12. Preferably, the upper edge of the container 12 is adapted to surround the flange 11 and is provided with a plurality of inward projections or detents 13 which are adapted to seat in bayonet joint slots 14 (see Fig. 4) provided in the flange 11. In this manner, the container 12 is removably attached to the flange 11 by means of a plurality of simple bayonet joints. Preferably, two such joints arranged diametrically opposite one another are employed. The container 12 has a perforated bottom through which the coffee infusion may pass into the receptacle 1. The bottom of the container 12 carries a central pin or stud 15 upon which a perforated distributing plate 16 is slidably mounted, the plate being carried by a sleeve 17 which is slidable along the stud. As will be described more fully hereinafter, the plate 16 serves to distribute the heated water over the bed of coffee grounds placed in the container 12.

A water receptacle 18, which is preferably formed of glass, is removably attached to the supporting structure of the heating unit. To this end, the lower part of the receptacle 18 is shaped as clearly illustrated in Fig. 2 and there are provided on the inner wall of ring 6 a plurality of resilient fingers 19 which are adapted to removably lock the bottom of receptacle 18 in place. These resilient fingers 19 may be held by the spider supports of the heating unit to simplify construction. Preferably, there are provided three of the spider supports 5 with a resilient finger 19 at each support. The water receptacle 18 may be forcibly removed by overcoming the resilience of the fingers 19 and when it is desired to replace the receptacle 18, it may be forcibly seated within the upper edge portion of ring 6 against the action of the resilient locking fingers 19.

The bottom of the water receptacle 18 preferably slopes downward slightly toward the center and at the center or apex point, there is provided a small metal bushing 20 within which there is loosely seated a pin 21 carrying a small disk 22 at its lower end and having a head 23 at its upper end. The bushing 20 is preferably tapered at its central opening and the head 23 is correspondingly tapered, thus providing a miniature valve structure. When the device is assembled, as shown in Fig. 2, the small disk 22 engages the upper surface of the heating unit so that the valve is opened and permits the water in receptacle 18 to flow at a slow rate through the small central valve opening. When the receptacle 18 is removed, however, the pin 21 drops by gravity, thus closing the miniature valve and the receptacle may be filled with water, the weight of the water also serving to retain the valve in closed position. When the receptacle with water therein is mounted in place, the valve automatically opens as above mentioned. The water receptacle 18 is provided with a lid 24, which is preferably formed of metal and seats upon the upper edge of the receptacle, as shown in Fig. 2.

Figure 3:
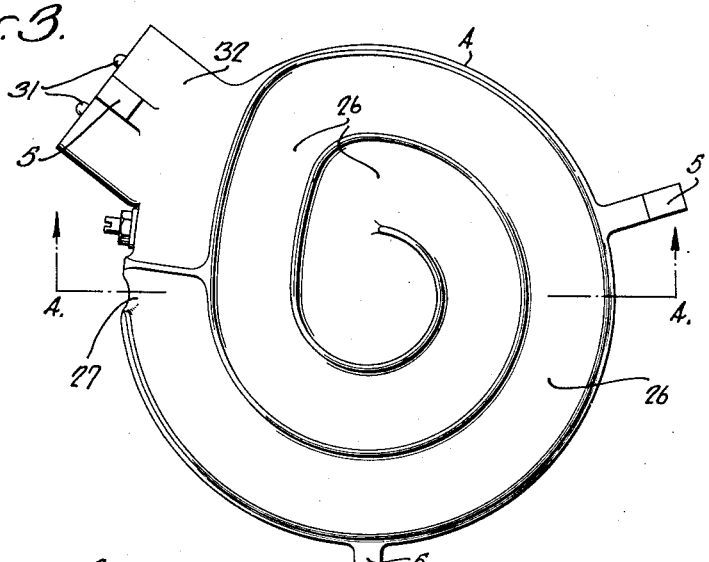
Fig. 3 is an upper face view of the heating unit.
Figure 4:
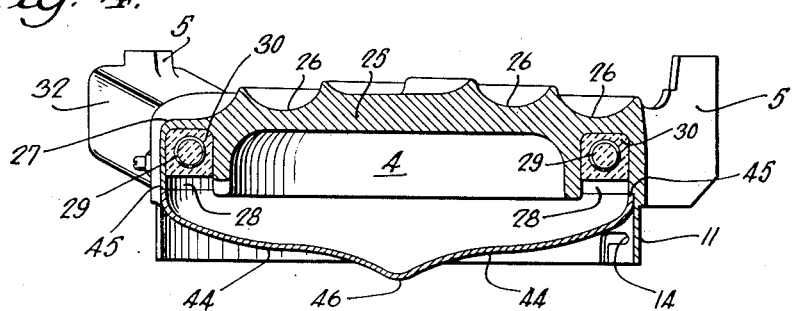
Fig. 4 is a sectional view taken along line 4—4 of Fig. 3.
Figure 5:
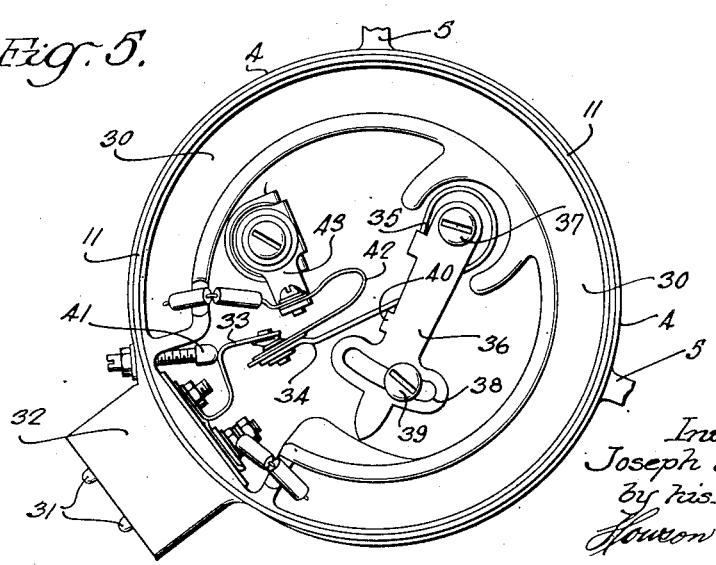
Fig. 5 is the lower face view of the unit with the lower plate thereof removed.

Referring now to Figs. 3 to 5, the heating unit 4 comprises a heating plate 25, the upper surface of which is adapted to receive water from the receptacle 18. This surface is of predetermined area in order that the water passing over it may be heated to the desired temperature. Preferably, the plate 25 is formed as illustrated in Figs. 3 and 4 so as to provide a spiral surface groove, runway or track 26 which slopes downward from the center to the discharge point 27, although the heating surface may be of any suitable form. Thus, the water passing through the central opening in the bottom of receptacle 18 traverses the spiral surface groove 26 and is discharged therefrom at the point 27. The spiral surface groove is of predetermined length such that when the plate 25 is supplied with a predetermined heat input, the water discharged from the said groove has acquired the desired temperature. The opening in the bottom of container 18 is of predetermined small dimension, permitting a slow rate of flow of the water from the container 18 to the upper surface of the heating unit. It will be noted that the rate of delivery of the water from the container 18 to the heating unit is dependent upon the head of the water as it flows from receptacle 18.

It is important to note that the water passage 26 is in the form of an open groove, runway or track on the upper surface of the heating unit 4. Actual use has shown that the restricted rate of flow of water over this passageway permits considerable deposit of lime from the water on the walls defining the open groove, runway or track, and this accumulation of deposited material tends to decrease the rate of heat transfer from the heating unit to the water. Since the successful operation of the device is dependent upon a constant rate of heat transfer to the water, as well as other factors, it is necessary that the deposit of lime or other accumulated material be removed. This is readily accomplished by wiping the surface of the walls defining the open groove, runway or track, and is further facilitated by the removability of the heating unit 4. If the passageway were closed, however, it would be practically impossible to remove the lime or other deposited materials and the device would not satisfactorily operate as intended.

The heating plate 25 is provided with an annular recess 28 within which there is disposed an electrical heating element 29 which may be imbedded in a refractory material 30 as will be well understood. The circuit of the heating element is energized by means of terminal prongs 31 which are adapted to receive a plug of the type commonly employed with electrical appliances. As illustrated in Fig. 3, the prong-enclosing structure 32 may serve as a support for one of the spider elements 5, while the other supporting elements for the heating unit may be made directly integral with plate 25.

Within the central recess of plate 25, there is provided a thermostatic switch, as shown in Fig. 5, which is adapted to control the circuit of the heating element 29 so as to prevent the temperature of plate 25 from rising above a certain value when the heat demand is less than the heat available. This switch comprises a stationary resilient contact arm 33 and a movable bimetallic arm 34, one end of which is secured at 35 to a metallic arm 36. The arm 36 is secured at one end to the plate 25 by means of the screw 37. The opposite end of the arm 36 is slotted at 38 and is adjustably secured by means of a screw 39 engaging the plate 25. The arm 36 has an extension or lug 40 which serves as a stop for the movable thermostatic arm 34. It will be seen that by loosening the screws 37, 39, the arm 36 may be pivotally moved to any desired position so as to adjust the thermostatic switch mechanism for a desired temperature. This adjustment, however, will normally be made at the factory. It will be noted that the thermostatic arm 34 derives heat by conduction from the plate 25 through the end portion of arm 36 so that the thermostatic element responds accurately to the temperature of plate 25. With a given adjustment, the arm 34 will flex away from the stationary arm 33 in response to heat from the plate 25 and will open the circuit of the heating element when the plate 25 attains the temperature for which the device has been adjusted. In this manner, the thermostatic switch mechanism prevents the temperature of the water-heating surface of plate 25 from rising above a predetermined constant temperature when the water supply does not utilize the entire heat output of the electric unit.

There is also provided an adjustable support or stop 41 for the resilient contact arm 33. This adjustment screw 41 extends through the peripheral wall of the heating unit so that it may be readily adjusted to vary the temperature at which the thermostatic switch will operate. To readily permit this adjustment, the external end of screw 41 is slotted, as clearly illustrated in Fig. 5, to permit adjustment by means of a screw driver or like tool.

It will be seen clearly from Fig. 5 that the thermostatic switch is in series relation with the heating element 29 so as to control the energization thereof. The switch arm 33 is connected to one of the terminal prongs 31, while the contact button on the end of arm 34 is connected by the electrical connector 42 to the terminal 43 to which one end of the heating element is connected. The other end of the heating element is connected to the other terminal prong 31.

As shown in Fig. 4, a thin lower plate 44 has its peripheral edge upturned and seated against an annular shoulder 45 provided on the plate 25. The plate 44 slopes downward toward its center and has an apex 46. It will be noted that the water discharged from the heating surface 26 at the discharge passage or recess 27 is caused to run down onto the plate 44 and the slow flowing small stream of heated water will, by surface tension, adhere to the lower surface of plate 44 and will run down to the apex 46, at which point it will drop from plate 44 onto the pin or stud 15 (see Fig. 2) and will run over the pin onto the perforated distributing plate 16. In this manner, the water is supplied centrally to the distributing plate which distributes it evenly over the bed of coffee grounds in container 12.

Considering the entire operation of the device, in using the device, the parts are first detached as described above, the coffee ground container 12 being detached from the heating unit and the desired quantity of ground coffee is placed in the container 12, after which the distributor plate 16 is placed on top of the coffee grounds and the container 12 is attached to the heating unit. The heating unit with the container 12 attached thereto is then mounted in place upon the top of the receptacle 1, after which the heating unit is energized in the manner above described. The water receptacle 18 may be taken to a water faucet and filled to the proper level, the valve in the bottom of this receptacle being closed and preventing the escape of water as described. The water receptacle is then placed in its proper position above the heating unit, causing the valve to open automatically and allowing the water to flow onto the upper surface of the heating unit. A slow stream of water, whose rate of flow gradually diminishes as the head of the water in receptacle 18 lowers, is thus caused to flow over the spiral groove, runway or track 26. Since the heating unit supplies a substantially constant amount of heat, the water is heated to a predetermined minimum temperature, the temperature of the water discharged from the heating unit increasing progressively due to the diminishing of the rate of flow over the groove, runway or track 26. The rate of flow of the water will diminish to a point where the water will be emitted from the receptacle 18 in the form of successive beads rather than in a steady stream. As long as the water consumes the heat supplied by the heating plate 25, the thermostatic switch does not function since the temperature of the plate does not rise to that for which the thermostat control is adjusted. However, when the rate of flow of the water diminishes to such an extent that the water does not consume the available heat, the thermostatic control functions to prevent the temperature of plate 25 from rising above a certain value. Thus, the thermostatic switch mechanism prevents the plate 25 from becoming too hot in the absence of water or when the flow of water has diminished materially. The adjustment of the thermostatic mechanism should be such as to prevent the temperature of plate 25 from rising above the boiling point of water, so that it functions when the rate of flow of the water along the heated runway is not capable of keeping the temperature of the plate below the boiling point.

If the heating unit is of the proper capacity and if the surface of the heating unit over which the water flows is of proper length, and if the water is delivered to the heating unit at a proper rate, the water will be delivered to the bed of coffee grounds in container 12 at a temperature which may be as low as 185° F. and as the rate of flow of the water diminishes, the temperature of the water delivered to the coffee grounds will closely approach the boiling point. It is important to note that this procedure is contrary to the usual procedure in drip coffee makers, wherein the temperature of the water which is brought into contact with the coffee grounds is a maximum at the start and the water becomes progressively cooler during the coffee-making operation. It has been found that better extraction and flavor are obtained where the delicate oils of the coffee are first removed by water at lower temperatures and the final complete extraction is effected by water of higher temperature. While the cycle of the present device follows generally the usual coffee percolator method or the old-fashioned pot method in which the temperature of the water is increased progressively, in these commonly used prior devices, the delicate flavors of the coffee which are first removed by water at low temperature are subsequently impaired by being subjected to the higher temperatures as the coffee-making operation proceeds. In the present device, however, the oils removed from the coffee are preserved, since, due to radiation and conduction losses, the highest temperature attained by the coffee infusion after leaving the coffee grounds is seldom over 175° F.

The purpose of the heater support 2 is to maintain the coffee infusion in the receptacle 1 at a proper drinking temperature over a considerable period of time. This heater support may be of general conventional form and may comprise a heating plate 47 on which the bottom of receptacle 1 is adapted to rest, and an electrical heating element for heating the plate 47, which element may be energized by means of terminal prongs 48.

From the above description, it will be seen that the invention provides a novel method of making coffee infusion and like beverage infusions and the invention provides a novel device for carrying out the method and for substantially meeting the "ideal" requirements in coffee making. It will be understood, of course, that the invention is not limited to the particular form of the device illustrated and described therein, but is capable of various changes and modifications within the scope of the appended claims.

I claim:

1. A coffee-making device, comprising a cold water reservoir having a small outlet opening at its bottom capable of passing a small quantity of water, whereby a slow stream of water is emitted gravitationally from said reservoir with a diminishing rate of flow, a coffee ground container disposed below said reservoir, a heating unit interposed between said reservoir and said container so as to receive water from said reservoir and supply it to said container, said heating unit having on its upper surface an open groove forming an open water passageway constructed and arranged to convey the diminishing water stream gravitationally, said open water passageway being accessible for removal of materials deposited on the walls thereof, heating means on said heating unit having a substantially constant predetermined heat input, whereby the temperature of the diminishing water stream increases progressively as the coffee-making operation proceeds, and a coffee infusion receptacle disposed beneath said coffee ground container so as to receive the coffee infusion therefrom.

2. A coffee-making device, comprising a cold water reservoir having a small outlet opening at its bottom capable of passing a small quantity of water, whereby a slow stream of water is emitted gravitationally from said reservoir with a diminishing rate of flow, a coffee ground container disposed below said reservoir, a heating unit interposed between said reservoir and said container so as to receive water from said reservoir and supply it to said container, said heating unit having a grooved upper surface forming a relatively long and narrow open water passageway for conveying the diminishing water stream gravitationally, said open water passageway being accessible for removal of materials deposited on the walls thereof, heating means on said heating unit having a substantially constant predetermined heat input, whereby the temperature of the diminishing water stream increases progressively as the coffee-making operation proceeds, thermostatic control means on said heating unit for preventing the temperature thereof from rising above a predetermined temperature, and a coffee infusion receptacle disposed beneath said coffee ground container so as to receive the coffee infusion therefrom.

3. A coffee-making device, comprising a cold water reservoir having a small outlet opening at its bottom capable of passing a small quantity of water, whereby a slow stream of water is emitted gravitationally from said reservoir with a diminishing rate of flow, a coffee ground container disposed below said reservoir, a heating unit interposed between said reservoir and said container so as to receive water from said reservoir and supply it to said container, said heating unit having its upper surface provided with an open, spiral groove forming an open, spiral water passageway for conveying the diminishing water stream gravitationally, said open, spiral water passageway being accessible for removal of materials deposited on the walls thereof, heating means on said heating unit having a substantially constant predetermined heat input, whereby the temperature of the diminishing water stream increases progressively as the coffee-making operation proceeds, thermostatic control means on said heating unit for preventing the temperature thereof from rising above a predetermined temperature, and a coffee infusion receptacle disposed beneath said coffee ground container so as to receive the coffee infusion therefrom.

4. In a coffee-making device, a heating unit comprising a water passageway and means for heating the same, a cold water reservoir disposed above the heating unit and having a small outlet opening in its bottom from which a slow stream of water is discharged with a diminishing rate of flow into the water passageway of the heating unit, an inwardly sloping surface at the underside of the heating unit terminating in a discharge point and arranged so that the heated water discharged from said passageway will flow along said surface by surface tension to said discharge point and be discharged therefrom, and a container for coffee grounds cooperatively associated with said heating unit to receive the heated water discharged from said surface.

JOSEPH W. MYERS.